(12) United States Patent
Kanayama et al.

(10) Patent No.: US 6,292,313 B1
(45) Date of Patent: Sep. 18, 2001

(54) LENS DRIVE UNIT

(75) Inventors: Atsushi Kanayama; Keiji Kaneko, both of Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/541,081

(22) Filed: Mar. 31, 2000

(30) Foreign Application Priority Data

Mar. 31, 1999 (JP) .................................................. 11-091593

(51) Int. Cl.[7] .............................. G02B 7/02; G02B 15/14
(52) U.S. Cl. ........................ 359/823; 359/696; 359/825
(58) Field of Search .................................. 359/823, 825, 359/696, 697, 698; 396/85, 86, 87, 297, 300; 352/139

(56) References Cited

U.S. PATENT DOCUMENTS

| | | | |
|---|---|---|---|
| 5,731,920 | * 3/1998 | Katsuragawa | 359/827 |
| 6,035,137 | 3/2000 | Kaneko et al. | 396/74 |
| 6,167,208 | * 12/2000 | Satoo | 396/532 |

* cited by examiner

Primary Examiner—Georgia Epps
Assistant Examiner—Saeed Seyrafi

(57) ABSTRACT

A zoom control connector, to which a zoom controller is connected, is disposed at the bottom of a drive unit of an ENG lens. When connecting the connector with the zoom controller, a unit discrimination circuit connects a changeover circuit with an A/D converter, and an analog control signal outputted from the zoom controller is converted into a digital signal to be sent to a CPU. In contrast, when connecting the connector with a personal computer, the unit discrimination circuit connects the changeover circuit with a communication IC, and a digital control signal outputted from the personal computer is sent to the CPU through serial communication. Thus, the CPU can execute respective control in accordance with the control signal from the zoom controller or the personal computer received through one connector.

5 Claims, 4 Drawing Sheets

F I G. 2
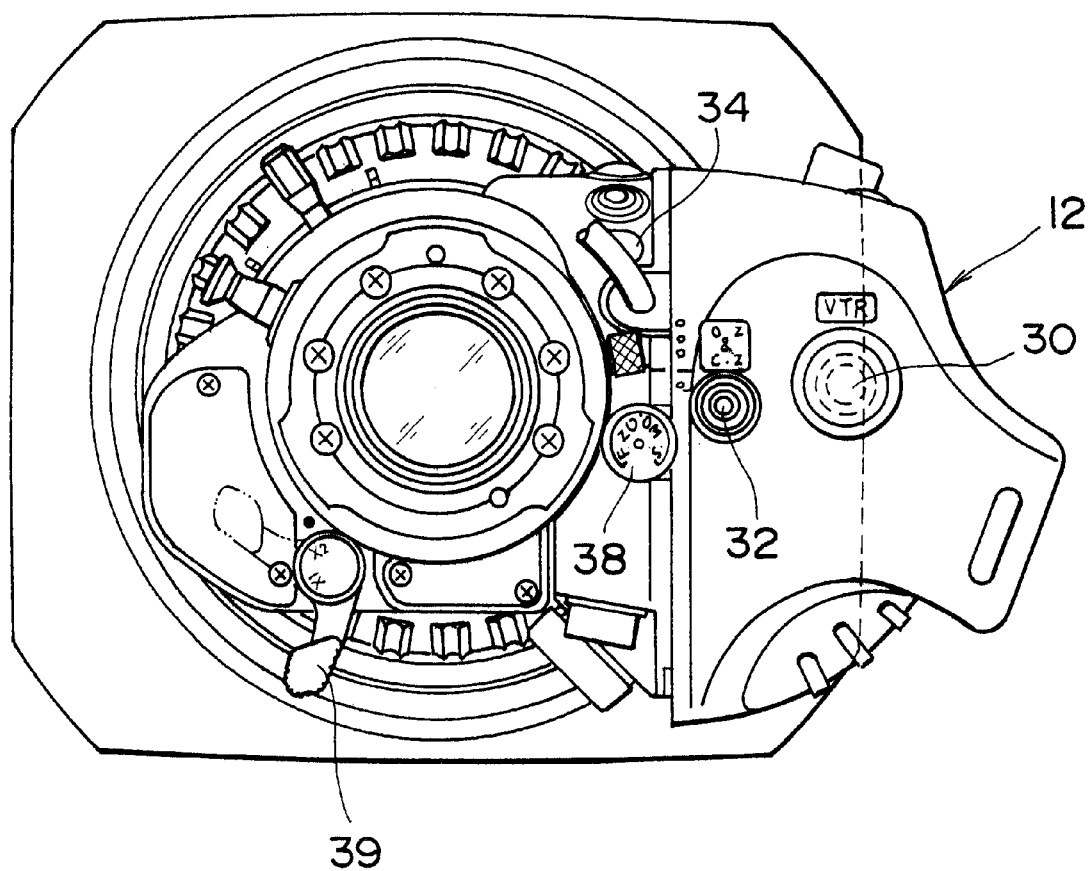

LENS DRIVE UNIT

BACKGROUND OF THE INVENTION

1. Field of the Invention

The present invention relates to a lens drive unit, more particularly to a lens drive unit to be attached to a side of an electronic news gathering (ENG) lens.

2. Description of Related Art

A drive unit for motor-driving an operation ring such as a focus ring, a zoom ring and an iris ring is attached at a side of a lens barrel of an ENG lens used for an ENG TV. camera. A seesaw switch (a bidirectional switch) is disposed to the drive unit, and a connector for connecting to an external controller so that the lens control in focussing, zooming, iris, and so forth, can be performed with the external controller.

A necessity has recently arisen to control the drive unit by digital communication, rather than an analog signal, through a serial interface especially by a personal computer in order to use the ENG lens at a virtual studio or to control the ENG lens over long distances. However, the conventional drive unit has no connector for the serial interface, and it is spatially difficult to equip the drive unit with a special connector for the serial interface.

SUMMARY OF THE INVENTION

The present invention has been developed in view of the above-described circumstances, and has as its object the provision of a lens drive unit that is capable of lens control by a computer without having a special connector.

In order to achieve the above-described object, the present invention is directed to a lens drive unit which is arranged at a side of a lens barrel, the lens drive unit comprising: a motor which is operatively connected with an operation ring on the lens barrel to drive one of a zoom lens, a focus lens and an iris within the lens barrel; a control device which controls the motor in accordance with a control signal to control the one of the zoom lens, the focus lens and the iris; a connector to which one of an external lens controller and an external computer outputting the control signal is connected; a connection determining device which determines which one of the external lens controller and the external computer is being connected to the connector; and an input changeover device which receives the control signal through the connector from the connected one of the external lens controller and the external computer, the input changeover device sending the received control signal to the control device through a first signal pass when the connection determining device determines that the external lens controller is being connected to the connector, the input changeover device sending the received control signal to the control device through a second signal pass when the connection determining device determines that the external computer is being connected to the connector.

According to the present invention, the connector to which the lens controller is normally connected is made connectable with the computer, so that the lens drive unit can be controlled with the computer without providing a special connector to which the computer is connected.

BRIEF DESCRIPTION OF THE DEALING

The nature of this invention, as well as other objects and advantages thereof, will be explained in the following with reference to the accompanying drawings, in which like reference characters designate the same or similar parts throughout the figures and wherein:

FIG. 2 is a rear view of the ENG lens equipped with the drive unit in FIG. 1;

DETAILED DESCRIPTION OF THE PREFERRED EMBODIMENT

This invention will be described in further detail by way of example with reference to the accompanying drawings.

Figure 1:
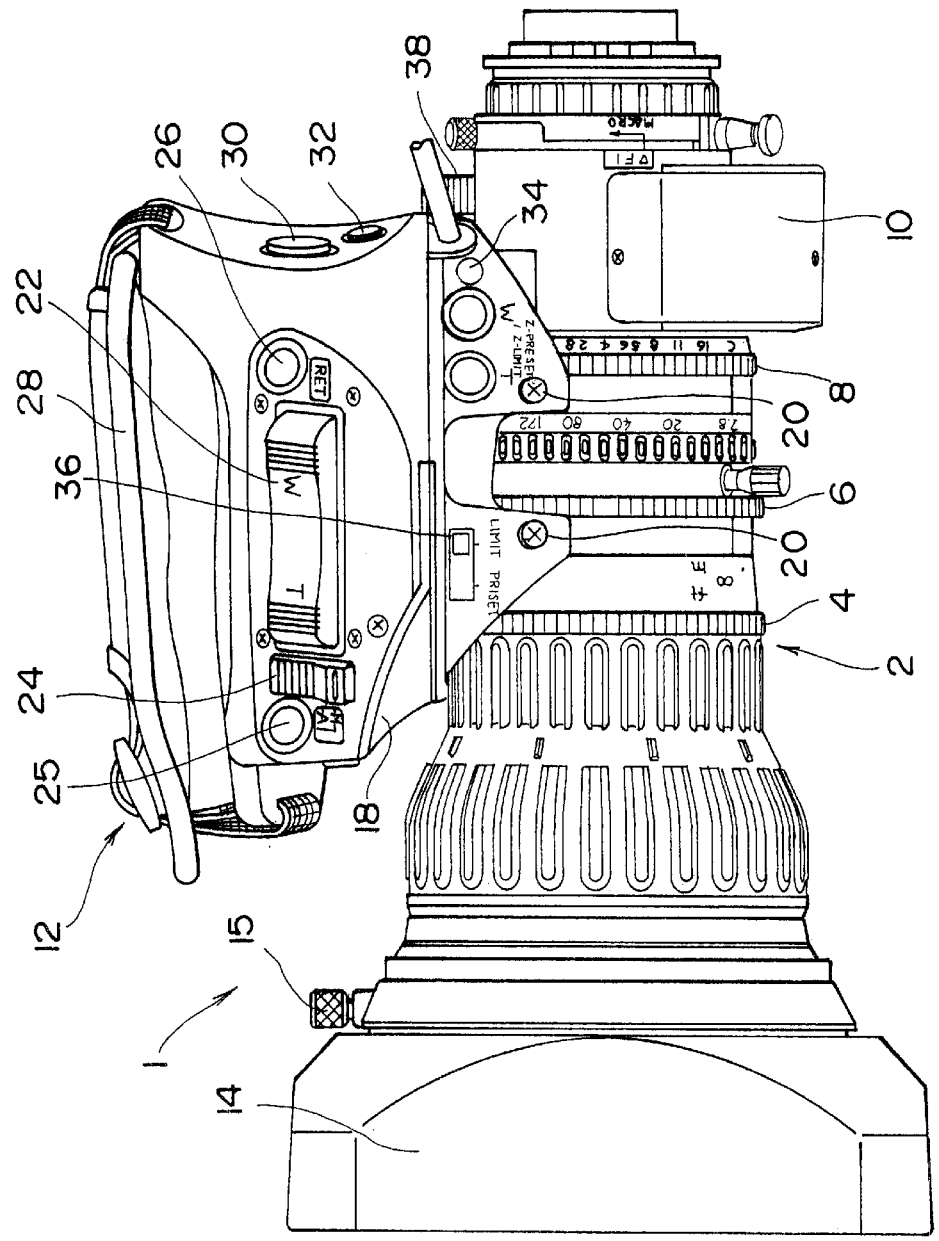
FIG. 1 is a plan view of an ENG lens equipped with a drive unit according to an embodiment of the present invention.
Figure 3:
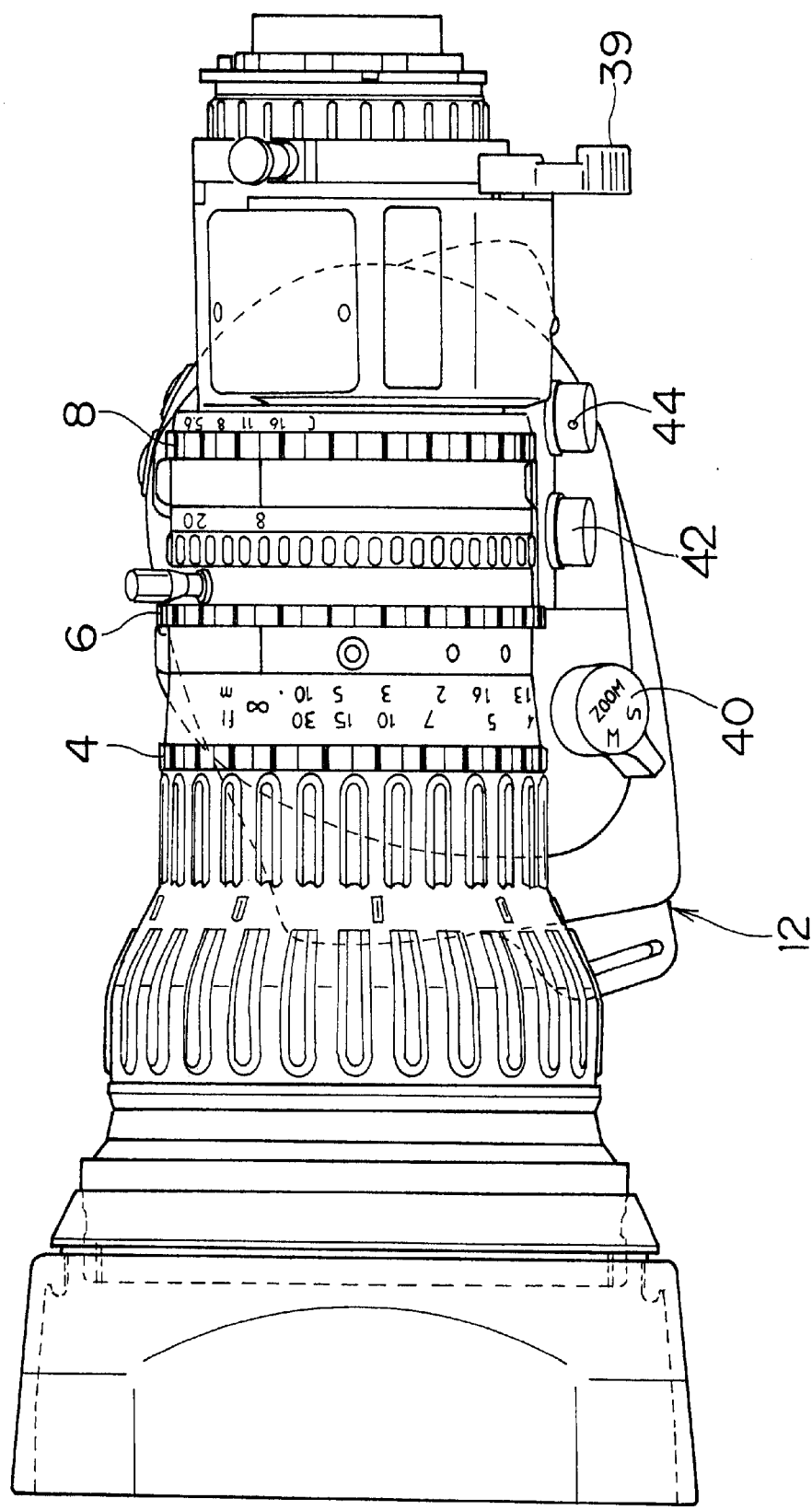
FIG. 3 is a side view of the ENG lens equipped with the drive unit in FIG. 1.

FIGS. 1–3 are a plan view, a rear view, and a side view, respectively, showing the external appearance of an ENG lens 1 equipped with a drive unit 12 according to an embodiment of the present invention. The ENG lens 1 in FIGS. 1–3 is an inner focussing zoom lens used on a TV camera for broadcast such as an ENG camera. A lens barrel 2 is provided with a focus ring 4, a zoom ring 6, and an iris ring 8, and an extender 10 is arranged at the rear end of the lens barrel 2.

A drive unit 12 for driving the focus ring 4, the zoom ring 6 and the iris ring 8 is provided at a side of the lens barrel 2. A lens hood 14 is attached to the lens barrel 2 with a fixing knob 15.

The inner construction of the lens barrel 2 is not shown in the drawings; however as commonly known, naming from the front, a fixed focus lens, a movable focus lens, a variable lens, an iris, a relay lens, and so forth, are arranged in the lens barrel 2, and the extender 10 is arranged further rear. Rotating the focus ring 4 moves the movable focus lens back and forth along the optical axis so as to adjust focussing, rotating the zoom ring 6 moves the variable lens back and forth along the optical axis so as to adjust zooming, and rotating the iris ring 8 adjusts an aperture size of the iris.

The drive unit 12 has a case 18, which is attached to the side of the lens barrel with screws 20. A focus drive motor (not shown) is arranged in the case 18, and the focus drive motor is operatively connected to the focus ring 4 through a gear transmission mechanism (not shown) so as to rotate and drive the focus ring 4. There is another type of the drive unit 12 to which the focus drive motor is not installed; and the present invention is also applicable to the drive unit 12 without the focus drive motor. A zoom drive motor 60 (see FIG. 4) is arranged in the case 18, and the zoom drive motor 60 is operatively connected to the zoom ring 6 through a gear transmission mechanism (not shown) so as to rotate and drive the zoom ring 6. An iris drive motor (not shown) is arranged in the case 18, and the iris drive motor is operatively connected to the iris ring 8 through a gear transmission mechanism (not shown) so as to rotate and drive the iris ring 8.

A zoom control seesaw switch (hereunder referred to as a seesaw switch) 22, an iris auto/manual mode changeover switch 24, an iris momentary switch 25, a return switch 26, and so forth, are provided at the top face of the case 18.

The seesaw switch 22 is disposed to be freely swingable with respect to a neutral position. As pressing the seesaw switch to either a telephoto (T) side or to a wide-angle (W) side, the zoom ring 6 rotates to either the telephoto side or to the wide-angle side. A zoom rate is adjustable corresponding to a pressing amount (operation amount) of the seesaw switch 22; the larger the pressing amount, the higher the zooming rate.

In proximity of the attaching screws 20, a preset switch 34 and a preset position memory switch 36 are provided for executing a preset function on the drive unit 12. As pressing the preset switch 34 and the preset position memory switch 36 together, a position of the variable lens (a zoom position) at that moment is stored in a memory as a preset position. If then pressing the preset switch 34 only, the variable lens is moved to the preset position stored in the memory.

A strap 28 is provided at the side of the case 18. The user inserts his/her right hand four fingers in the strap 28 in order to hold the lens barrel 2.

As shown in FIG. 2, a recording switch 30 and a quick zoom & constant rate auto zoom switch 32 are disposed for the user to operate with his/her right hand thumb. The recording switch 30 is operated to start/finish recording a shot image.

The quick zoom & constant rate auto zoom switch 32 are used for executing both quick zooming and auto zooming at a constant rate. As pressing the switch 32 while the variable lens is stopped, the quick zooming function is activated, and as pressing the switch 32 while operating the seesaw switch 22 (i.e., while the variable lens is moving), the constant rate auto zooming function is activated. The quick zooming moves the variable lens in a direction toward the telephoto end at a predetermined high zoom rate while pressing the switch 32, and returns the variable lens to the original zoom position (the position at the start of the pressing of the quick zoom switch 32) at a predetermined zoom rate when releasing the switch 32. The constant rate auto zooming maintains a moving rate (zoom rate) of the variable lens, which is driven in accordance with the operation of the seesaw switch 22, to be a rate when the switch 32 is pressed. Thus, pressing the switch 32 at a desired zoom rate adjusted by appropriately pressing the seesaw switch 22 to the telephoto (T) side or to the wide-angle (W) side causes the zoom rate to be maintained constant despite releasing the seesaw switch 22.

A maximum zoom rate adjusting knob 38 is provided at the rear of the case 18. Rotating the knob 38 suitably changes a zoom rate at pressing the seesaw switch 22 the deepest (the maximum zoom rate). For example, the further the rotation of the maximum zoom rate adjusting knob 38 clockwise, the higher the maximum zoom rate to be set; on the contrary, the further the rotation of the knob 38 counterclockwise, the lower the maximum zoom rate to be set. A zoom rate at reproducing the presetting when pressing the preset switch 34 is also changeable in response to the set position of the maximum zoom rate adjusting knob 38.

An extender switch lever 39 is provided at the rear of the lens barrel 2, so that the extender 10 can be inserted in or pulled out from the optical path by rotating the lever 39.

As shown in FIG. 3, a servo/manual changeover knob 40, a power source output connector 42 and a zoom control connector 44 are arranged at the bottom of the case 18. The servo/manual changeover knob 40 is operated to change servo drive (motor drive) or manual drive of the zoom ring 6. The power source output connector 42 can output power to an external device.

For example, a dozen of pins are disposed in the zoom control connector 44. The zoom control connector 44 can connect with a zoom controller so that zooming is controlled in accordance with an external control signal outputted from the zoom controller Moreover, the zoom control connector 44 can be used also as a connector for a serial interface, and is connectable with a personal computer. The personal computer connected to the zoom control connector 44 can control not only zooming but also focussing and iris.

Figure 4:
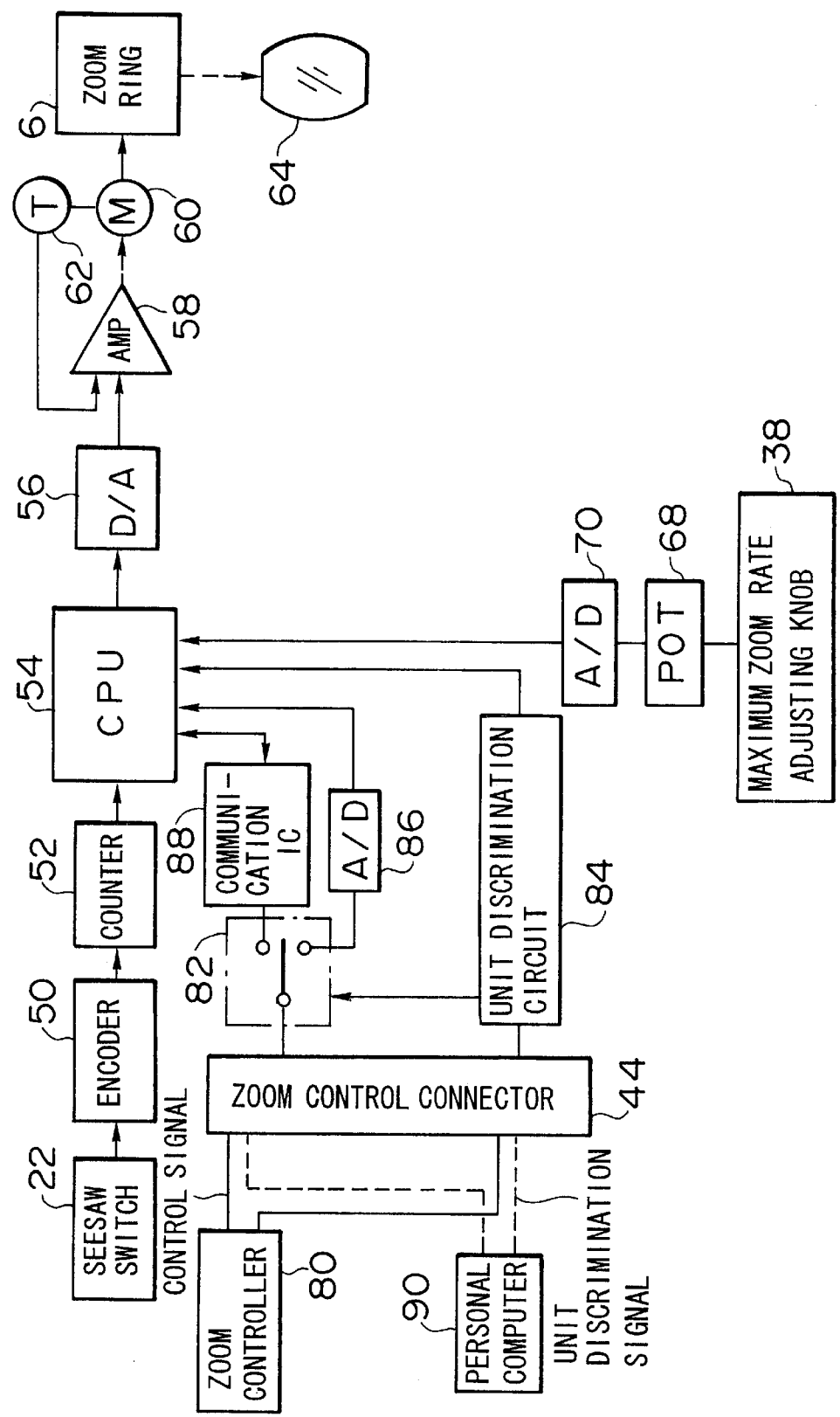
FIG. 4 is a block diagram showing the construction of essential circuits of the drive unit.

FIG. 4 is a block diagram showing the essential circuits of the drive unit 12. First, a circuit block for zoom control in accordance with operation of the seesaw switch 22 will be explained. The seesaw switch 22 is connected with a rotational axis of, for example, an incremental-type rotary encoder 50 (hereunder referred to as an encoder 50). When the seesaw switch 22 is operated, the encoder 50 outputs pulses of a number and a phase (a phase of a pulse between phases in outputting a pulse of two phases) corresponding to the pressing direction and the pressing amount of the seesaw switch 22. The counter 52 counts the pulse outputted from the encoder 50, and the counter 52 outputs to a CPU 54 a value within a predetermined range representing the pressing direction and the pressing amount of the seesaw switch 22. The CPU 54 determines the rotational direction and the rotational speed of the zoom drive motor 60 (hereunder referred to as the motor 60) in accordance with the given value from the counter 52. At that time, the CPU 54 obtains an analog voltage representing a setting position of the maximum zoom rate adjusting knob 38 outputted from a potentiometer 68 through an A/D converter 70, and the CPU 54 determines the rotational speed of the motor 60 such that the zoom rate at the maximum pressing amount of the seesaw switch 22 can be the maximum zoom rate set by the maximum zoom rate adjusting knob 38.

After determining the rotational direction and the rotational speed of the motor 60 as described above, the CPU 54 accordingly produces a speed control signal (a motor control signal) to drive the motor 60 and outputs it to a D/A converter 56. The D/A converter 56 converts the speed control signal into an analog signal and outputs it to an amplifier 58. The amplifier 58 applies to the motor 60 a voltage corresponding to a difference between the rotational speed indicated with the speed control signal and an actual rotational speed of the motor 60, which is fed back to the amplifier 58 as a voltage signal by a tachogenerator 62 measuring the actual rotational speed of the motor 60. The motor 60 thereby rotates in the rotational direction and with the rotational speed determined by the CPU 54. The zoom ring 6, which is operatively connected with the motor 60, thus rotates in the rotational direction and with the rotational speed corresponding to the pressing direction and the pressing amount of the seesaw switch 22; and the variable lens 64 accordingly moves as a result.

Next, an explanation will be given on a circuit block for obtaining the control signal from the zoom controller 80 or the personal computer 90 connected to the zoom control connector 44. When the zoom controller 80 is connected to the zoom control connector 44, predetermined pins of the zoom control connector 44 receive a unit identification signal and the control signal in analog form from the zoom controller 80. On the other hand, when the personal computer 90 is connected to the zoom control connector 44, predetermined pins of the zoom control connector 44 receive a unit identification signal and the control signal in digital form through serial communication from the personal computer 90. Then the control signal and the unit identification signal from the zoom controller 80 or the personal computer 90 are sent to a changeover circuit 82 and a unit discrimination circuit 84, respectively, through the zoom control connector 44.

The unit discrimination circuit 84 judges which of the zoom controller 80 or the personal computer 90 is connected to the zoom control connector 44 in accordance with the unit identification signal received through the zoom control connector 44. Such a judgement is performed in accordance with, for example, the difference in voltage between each unit identification signal of the zoom controller 80 and the personal computer 90. Alternatively, the judgement may be performed in accordance with the format of the control signal received through the zoom control connector 44, instead of the unit identification signal.

When the unit discrimination circuit 84 recognizes the connection of the zoom controller 80 with the zoom control connector 44, the unit discrimination circuit 84 sets the connection of the changeover circuit 82 to the A/D converter 86 and also notifies the CPU 54 the connection of the zoom controller 80. Then, the control signal that is received from the zoom controller 80 through the zoom control connector 44 is sent to the AID converter 86 through the changeover circuit 82, which converts the control signal into the digital signal, and is inputted into the CPU 54. The CPU 54 executes a program for processing the signal from the zoom controller 80 to produce the speed control signal in the same manner as the described above in accordance with the received control signal from the A/D converter 86, and outputs the speed control signal to the D/A converter 56. Thereby the motor 60 is driven in accordance with the control signal outputted from the zoom controller 80.

When the unit discrimination circuit 84 recognizes the connection of the personal computer 90 with the zoom control connector 44, the unit 10 discrimination circuit 84 sets the connection of the changeover circuit 82 to a communication IC 88 and notifies the CPU 54 the connection of the personal computer 90. Then, the control signal that is received from the personal computer 90 through the zoom control connector 44 in serial communication is sent to the communication IC 88 through the changeover circuit 82, and the control signal is modified by the communication IC 88 and is inputted to the CPU 54. The CPU 54 executes a program for processing the signal from the personal computer 90 to execute respective lens control in accordance with the inputted control signal from the communication IC 88. If the personal computer 90 is connected to the zoom control connector 44, desired lens control, not only zoom control, but also focus control, iris control, and so forth, are possible depending on programming. In this case, the CPU 54 controls the zoom drive motor 60, and further the focus drive motor, the iris drive motor, and so forth, in accordance with the control signal outputted from the personal computer 90. The personal computer 90 can obtain from the CPU 54 respective data of a zoom position, a focus position, an iris position, and so forth of the ENG lens 1 via the communication IC 88, and also can perform overall program control on zooming, focussing, and iris of the ENG lens 1.

In the above-described embodiment, the zoom control connector 44 to which the zoom controller 80 for outputting the analog control signal is connected is used also as a connector for the personal computer 90; however, the present invention is not limited to this. A connector to which a zoom controller for outputting a digital control signal is connected may be used as a connector for the personal computer 90 as well. In this case, a communication IC for transmitting and managing the digital signal outputted from the zoom controller is provided instead of the A/D converter 86.

In the above-described embodiment, the zoom control connector 44 for zoom controller to which the zoom controller 80 is connected is used also as a connector for the personal computer 90; however, the present invention is not limited to this. Another connector to which the lens controller for outputting the control signal for focussing and/or iris is connected may be used as a connector for the personal computer 90 as well.

As described above, the lens drive unit of the present invention is capable of connecting the connector, to which a lens controller is usually connected, with a computer; therefore, the lens drive unit is capable of lens control by a computer without providing a special connector.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens drive unit which is arranged at a side of a lens barrel, the lens drive unit comprising:

a motor which is operatively connected with an operation ring on the lens barrel to drive one of a zoom lens, a focus lens and an iris within the lens barrel;

a control device which controls the motor in accordance with a control signal to control the one of the zoom lens, the focus lens and the iris;

a connector to which one of an external lens controller and an external computer outputting the control signal is connected;

a connection determining device which determines which one of the external lens controller and the external computer is being connected to the connector; and an input changeover device which receives the control signal through the connector from the connected one of the external lens controller and the external computer, the input changeover device sending the received control signal to the control device through a first signal pass when the connection determining device determines that the external lens controller is being connected to the connector, the input changeover device sending the received control signal to the control device through a second signal pass when the connection determining device determines that the external computer is being connected to the connector.

2. The lens drive unit as defined in claim 1, wherein:

at least one of the external lens controller and the external computer outputs an identification signal; and the connection determining device determines which one of the external lens controller and the external computer is being connected to the connector in accordance with the identification signal.

3. The lens drive unit as defined in claim 1, wherein the connection determining device determines which one of the external lens controller and the external computer is being connected to the connector in accordance with a format of the control signal received through the connector.

4. The lens drive unit as defined in claim 1, wherein the first signal pass comprises a first signal processing circuit which processes the control signal outputted from the external lens controller and sends the processed control signal to the control device.

5. The lens drive unit as defined in claim 1, wherein the second signal pass comprises a second signal processing circuit which processes the control signal outputted from the external computer and sends the processed control signal to the control device.

* * * * *